United States Patent
Xiao et al.

(10) Patent No.: US 9,002,389 B2
(45) Date of Patent: Apr. 7, 2015

(54) METHOD, APPARATUS, AND TERMINAL FOR DETERMINING TRANSMISSION MODE

(75) Inventors: Dengkun Xiao, Beijing (CN); Wenjie Wang, Istanbul (TR); Wurong Zhang, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 264 days.

(21) Appl. No.: 13/235,150

(22) Filed: Sep. 16, 2011

(65) Prior Publication Data
US 2012/0003941 A1 Jan. 5, 2012

Related U.S. Application Data

(63) Continuation of application No. PCT/CN2009/070825, filed on Mar. 17, 2009.

(51) Int. Cl.
| | | |
|---|---|---|
| H04W 72/00 | (2009.01) | |
| H04W 52/02 | (2009.01) | |
| H04W 72/08 | (2009.01) | |
| H04W 72/04 | (2009.01) | |
| H04W 72/06 | (2009.01) | |

(52) U.S. Cl.
CPC ........ *H04W 52/0229* (2013.01); *H04W 72/048* (2013.01); *H04W 72/06* (2013.01); *H04W 72/08* (2013.01); *Y02B 60/50* (2013.01)

(58) Field of Classification Search
USPC .................. 455/509, 67.11, 516, 62, 68, 69
See application file for complete search history.

(56) References Cited

U.S. PATENT DOCUMENTS

| | | | | |
|---|---|---|---|---|
| 7,460,878 | B2 * | 12/2008 | Itoh .............................. | 455/522 |
| 7,610,495 | B2 * | 10/2009 | Azadet et al. ................. | 713/300 |
| 7,760,686 | B2 * | 7/2010 | Saito et al. .................... | 370/329 |
| 8,320,312 | B2 * | 11/2012 | Olsson et al. ................. | 370/329 |
| 8,355,313 | B2 * | 1/2013 | Walton et al. ................. | 370/208 |
| 2004/0203759 | A1 * | 10/2004 | Shaw et al. .................... | 455/433 |
| 2005/0261038 | A1 * | 11/2005 | Chary ........................... | 455/574 |

(Continued)

FOREIGN PATENT DOCUMENTS

| | | |
|---|---|---|
| CN | 101365223 A | 2/2009 |
| CN | 101379860 A | 3/2009 |

(Continued)

OTHER PUBLICATIONS

Notice of Reason for Rejection received in Application No. 2012-500029 mailed Jan. 22, 2013, 8 pages.

(Continued)

*Primary Examiner* — Wen Huang
(74) *Attorney, Agent, or Firm* — Slater & Matsil, L.L.P.

(57) ABSTRACT

Embodiments of the present invention disclose a method, an apparatus, and a terminal for determining a transmission mode, which relate to the field of communications technologies and are invented to enable a selection of a transmission mode with lower power consumption for a terminal to reduce the power consumption of the terminal. The method includes: selecting a transmission mode for a terminal according to a network resource condition; judging whether the selected transmission mode matches according to capability information reported by the terminal and if the selected transmission mode matches, setting the transmission mode as a current transmission mode of the terminal. The embodiments of the present invention are mainly applicable to a Long Term Evolution Advance (LTE-A) system.

20 Claims, 3 Drawing Sheets

(56) References Cited

U.S. PATENT DOCUMENTS

| | | | |
|---|---|---|---|
| 2007/0082604 A1* | 4/2007 | Rueckriem | 455/3.04 |
| 2008/0024849 A1 | 1/2008 | Hayashi et al. | |
| 2008/0051129 A1* | 2/2008 | Abe et al. | 455/550.1 |
| 2009/0042582 A1 | 2/2009 | Wang et al. | |
| 2009/0042616 A1* | 2/2009 | Teo et al. | 455/562.1 |
| 2009/0093257 A1* | 4/2009 | Rinne et al. | 455/452.1 |
| 2009/0124300 A1* | 5/2009 | Park et al. | 455/574 |
| 2010/0081376 A1* | 4/2010 | Emura | 455/41.1 |
| 2010/0222007 A1* | 9/2010 | Rao et al. | 455/67.11 |
| 2010/0291918 A1* | 11/2010 | Suzuki et al. | 455/422.1 |

FOREIGN PATENT DOCUMENTS

| | | |
|---|---|---|
| JP | 2005-026878 A | 1/2005 |
| WO | WO 2006/125738 A1 | 11/2006 |
| WO | WO 2007/105300 A1 | 9/2007 |

OTHER PUBLICATIONS

Supplementary European Search Report received in European Patent Application No. 09841688.6-1525, mailed Apr. 10, 2012, 17 pages.
International Search Report and Translation received in the Patent Cooperation Treaty Application No. PCT/CN2009/070825, mailed Dec. 31, 2009, 6 pages.
Written Opinion of the International Searching Authority and Translation received in Patent Cooperation Treaty Application No. PCT/CN2009/070825, mailed Dec. 31, 2009, 8 pages.
LG Eletronics, "Proposals and Issues on the Carrier Aggregation and Control Signaling for LTE-A," 3GPP TSG RAN WG1 #55, R1-084194, Prague, Czech, Nov. 10-14, 2008, 6 pages.
Motorola, "LTE-A Spectrum Aggregation Scenarios and Impact of UE Architecture," 3GPP TSG RAN WG1 Meeting #54, R1-083225, Jeju Island, South Korea, Aug. 18-22, 2008, 10 pages.
Motorola, "Spectrum Aggregation Operations-UE Impact Considerations," 3GPP TSG RAN WG1 Meeting #55, R1-084405, Prague, Czech Republic, Nov. 10-14, 2008, 4 pages.
NEC Group, "DL/UL Resource Signaling for LTE-Advanced System," 3GPP TSG RAN WG1 #56, R1-090648, Athens, Greece, Feb. 9-13, 2009, 6 pages.
Noel, Frederic, "Higher Data Rates in GSM/EDGE With Multicarrier," Master Thesis, Nokia Research Center and Chalmers University of Technology, XP-002368895, Sep. 2000-Apr. 2001, 61 pages.
Nokia Siemens Networks, et al., "Algorithms and Results for Autonomous Component Carrier Selection for LTE-Advanced," 3GPP TSG RAN WG1 #55 Meeting, R1-084321, Prague, Czech Republic, Nov. 10-14, 2008, 6 pages.
Nokia Siemens Networks, "Node B Measurements for LTE," 3GPP TSG RAN WG1 #50 Meeting, R1-073682, Athens, Greece, Aug. 20-24, 2007, 7 pages.
Nokia Siemens Networks, "Uplink and Downlink ICIC Indication," 3GPP TSG-RAN WG3 Meeting #59, R3-080398, Sorrento, Italy, Feb. 11-15, 2008, 5 pages.
NTT DOCOMO, "Initial Access Procedure for Asymmetric Wider Bandwidth in LTE-Advanced," 3GPP TSG RAN WG1 Meeting #55bis, R1-090312, Ljubljana, Slovenia, Jan. 12-16, 2009, 5 pages.
NTT DOCOMO, "Views on Downlink Reception Bandwidth Considering Power Saving Effect in LTE-Advanced," 3GPP TSG RAN WG1 Meeting #55bis, R1-090310, Ljubljana, Slovenia, Jan. 12-16, 2009, 5 pages.
NTT DOCOMO, "Views on Downlink Reception Bandwidth Considering Power Saving Effect in LTE-Advanced," 3GPP TSG RAN WG1 Meeting #56, R1-090898, Athens, Greece, Feb. 9-13, 2009, 5 pages.
NTT DOCOMO, "Views on UE Capability and UE Categories in LTE-Advanced," 3GPP TSG RAN WG1 Meeting #55bis, R1-090318, Ljubljana, Slovenia, Jan. 12-16, 2009, 4 pages.
Panasonic, "Discussion on When UE Starts Aggregating Carriers," 3GPP TSG RAN WG1 Meeting #55bis, R1-090261, Ljubljana, Slovenia, Jan. 12-16, 2009, 2 pages.
3$^{rd}$ Generation Partnership Project, "Technical Specification Group Radio Access Network; Evolved Universal Terrestrial Radio Access (E-UTRA); Physical Layer—Measurements (Release 8)," 3GPP TS 36.214, v8.6.0, Mar. 2009, 12 pages.
3$^{rd}$ Generation Partnership Project, "Technical Specification Group Radio Access Network; Evolved Universal Terrestrial Radio Access (E-UTRA) User Equpment (UE) Radio Access Capabilities (Release 8)," 3GPP TS 36.306, v8.3.0, Mar. 2009, 14 pages.
3$^{rd}$ Generation Partnership Project, "Technical Specification Group Radio Access Network; Evolved Universal Terrestrial Radio Access (E-UTRA) Medium Access Control (MAC) Protocol Specification (Release 8)," 3GPP TS 36.321, v8.4.0, Dec. 2008, 40 pages.
3$^{rd}$ Generation Partnership Project, "Technical Specification Group Radio Access Network; Evolved Universal Terrestrial Radio Access Network (E-UTRAN); X2 Application Protocol (X2AP) (Release 8)," 3GPP TS 36.423, v8.5.0, Mar. 2009, 100 pages.
ZTE, "Downlink Control Structure for LTE-A," 3GPP TSG RAN WG1 Meeting #56, R1-090628, Athens, Greece, Feb. 9-13, 2009, 5 pages.
First Chinese Office Action received in Chinese Application No. 200980124907.6, mailed Aug. 3, 2012, 9 pages. (Partial Translation).

* cited by examiner

METHOD, APPARATUS, AND TERMINAL FOR DETERMINING TRANSMISSION MODE

This application is a continuation of International Application No. PCT/CN2009/070825, filed on Mar. 17, 2009, which is hereby incorporated by reference in its entirety.

TECHNICAL FIELD

The present invention relates to the field of communications technologies, and in particular, to a method, an apparatus, and a terminal for determining a transmission mode.

BACKGROUND

In an LTE-A (Long Term Evolution Advance, Long Term Evolution Advanced) system, in order to aggregate multiple wavebands, a transmitter/receiver of a terminal in the system is required to be capable of working in both a wideband transmission mode and a narrowband transmission mode. Therefore, a mechanism of the transmitter/receiver of the terminal becomes more complex.

As seen from a structure of a current terminal, terminals of different manufacturers may adopt different structures; therefore, with respect to a structure of a particular transmitter/receiver, due to a limitation of an operational feature of its integrated circuit components, in different transmission modes, power consumption of a terminal varies when the terminal transmits/receives the same volume of data, which is likely to result in an increase of power consumption of the terminal.

SUMMARY OF THE INVENTION

Embodiments of the present invention provide a method and an apparatus for determining a transmission mode to enable a selection of a transmission mode with lower power consumption for a terminal in order to reduce the power consumption of the terminal.

Embodiments of the present invention adopt the following technical solutions.

A method for determining a transmission mode includes:
selecting a transmission mode for a terminal according to a network resource condition; and
judging whether the selected transmission mode matches according to capability information reported by the terminal and if the selected transmission mode matches, setting the transmission mode as a current transmission mode of the terminal.

An apparatus for determining a transmission mode includes:
a transmission mode selecting unit, configured to select a transmission mode for a terminal according to a network resource condition; and
a transmission mode determining unit, configured to judge whether the selected transmission mode matches according to capability information of the terminal and if the selected transmission mode matches, set the transmission mode as a current transmission mode of the terminal.

The method and apparatus for determining a transmission mode provided by the embodiments of the present invention select a suitable transmission mode for a terminal according to the capability information of the terminal. Therefore, by using the technical solutions of the embodiments of the present invention, the power consumption of the terminal is reduced.

An embodiment of the present invention also provides a terminal, where the terminal can be used to reduce power consumption and includes:
a capability information reporting unit, configured to report capability information of the terminal, where the capability information of the terminal carries information about a transmission mode suitable for the terminal; and
a transmission mode information receiving unit, configured to receive transmission mode information that is determined by a network according to the capability of the terminal.

The terminal according to the embodiment of the present invention can report the information about the transmission mode suitable for the terminal to the network, enabling the network to select a matching transmission mode for the terminal, thereby reducing the power consumption of the terminal.

BRIEF DESCRIPTION OF THE DRAWINGS

To make the technical solutions of the embodiments of the present invention clearer, the accompanying drawings used in the description of the embodiments are briefly described hereunder. Evidently, the accompanying drawings illustrate only some exemplary embodiments of the present invention and those skilled in the art can obtain other drawings based on these accompanying drawings without creative efforts.

DETAILED DESCRIPTION OF ILLUSTRATIVE EMBODIMENTS

The technical solutions of the embodiments of the present invention are described clearly and completely below with reference to the accompanying drawings in the embodiments of the present invention. It is evident that the described embodiments are only some exemplary embodiments of the present invention, rather than all embodiments of the present invention. All other embodiments that those skilled in the art obtain without creative efforts based on the embodiments of the present invention also fall within the protection scope of the present invention.

Figure 1:
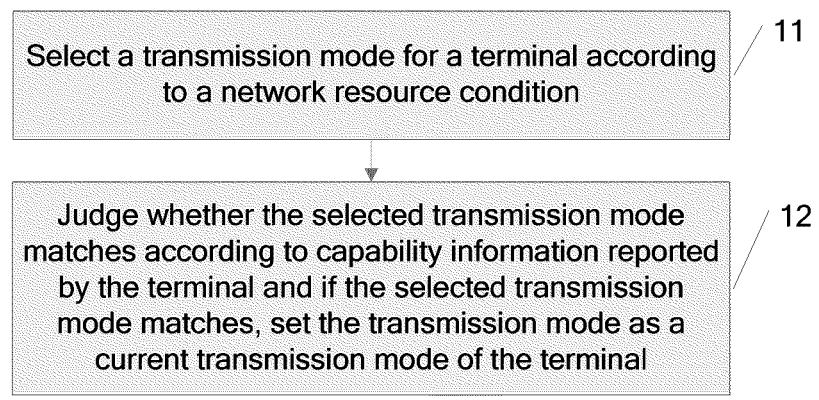
FIG. 1 is a flowchart of a method for determining a transmission mode according to a first embodiment of the present invention.

In order to reduce power consumption of a terminal, a first embodiment of the present invention provides a method for determining a transmission mode. As shown in FIG. 1, the method includes the following steps.

Step 11: Select a transmission mode for the terminal according to a network resource condition.

Here, the network resource condition may include the number of physical resource blocks (PRBs), magnitude of interference, and so on. Moreover, for an uplink transmission direction and a downlink transmission direction, the methods for selecting a transmission mode for a terminal may be different.

In the uplink direction, when a buffer of the terminal is capable of meeting a requirement for uplink data transmission and uplink interference is less than a first preset threshold, a wideband transmission mode is selected for the terminal; otherwise a narrowband transmission mode is selected. The first preset threshold may be set based on a specific need.

In the downlink direction, when the PRBs allocated for the terminal meet required PRBs for downlink data transmission and downlink interference is less than a second preset threshold, a wideband transmission mode is selected for the terminal; otherwise a narrowband transmission mode is selected. The second preset threshold may be set based on a specific need. Specifically, in the downlink direction, the transmission mode suitable for the terminal may be determined in the following way:

Firstly, determine whether the number of PRBs allocated for the terminal meets the required number of PRBs for downlink transmission.

Assuming that the number of idle PRBs on carrier 1 and carrier 2 are $n_1$ and $n_2$, and that the number of PRBs for downlink transmission is $n_r$, if $n_1+n_2>=n_r$, it indicates that the number of PRBs allocated for the terminal meets the requirement for downlink transmission.

Then, determine a downlink interference condition. It can be calculated by using the following formula:

$$n_r * p * g_r <= I_{min,DL},$$

$$I_{min,DL} = \min\{I_1, I_2, \ldots, I_k\}$$

$$I_j = \frac{n_j \times RSRP_j}{RSRQ_j}$$

where, $I_{min,DL}$ is the second preset threshold, k is the number of aggregated carriers of a NodeB, p is transmission power allocated to a user, $n_j$, $RSRP_j$ and $RSRQ_j$ are respectively the number of PRBs corresponding to a measured bandwidth, reference signal received power, and reference signal received quality.

As seen from the preceding process, when the PRBs allocated for the terminal meet the requirement for downlink data transmission and the downlink interference is less than the threshold for downlink interference, a wideband transmission mode is selected for the terminal to carry out data transmission. Otherwise, a narrowband transmission mode is selected.

Step 12: Judge whether the selected transmission mode matches according to capability information reported by the terminal, and if matches, set the transmission mode as a current transmission mode of the terminal.

In the capability information reported by terminal, 1 bit of information in the existing capability information of the terminal may be used to indicate a transmission mode matching the terminal, for example, 0 indicates that a wideband transmission mode is suitable for the terminal, while 1 indicates that a narrowband transmission mode is suitable for the terminal, or vice versa. Here, a transmission mode that is suitable for the terminal may indicate a transmission mode in which the power consumption of the terminal is lower. Alternatively, 0 indicates that the power consumption of the terminal is approximately the same in a wideband transmission mode and in a narrowband transmission mode, while 1 indicates that the power consumption of the terminal in a narrowband transmission mode is higher than that in a wideband transmission mode, or vice versa.

As seen from the technical solution of the first embodiment of the present invention, in the first embodiment of the present invention, a suitable transmission mode is selected for a terminal according to the capability information of the terminal. Therefore, by using the technical solution of the embodiment of the present invention, the power consumption of the terminal is reduced.

Figure 2:
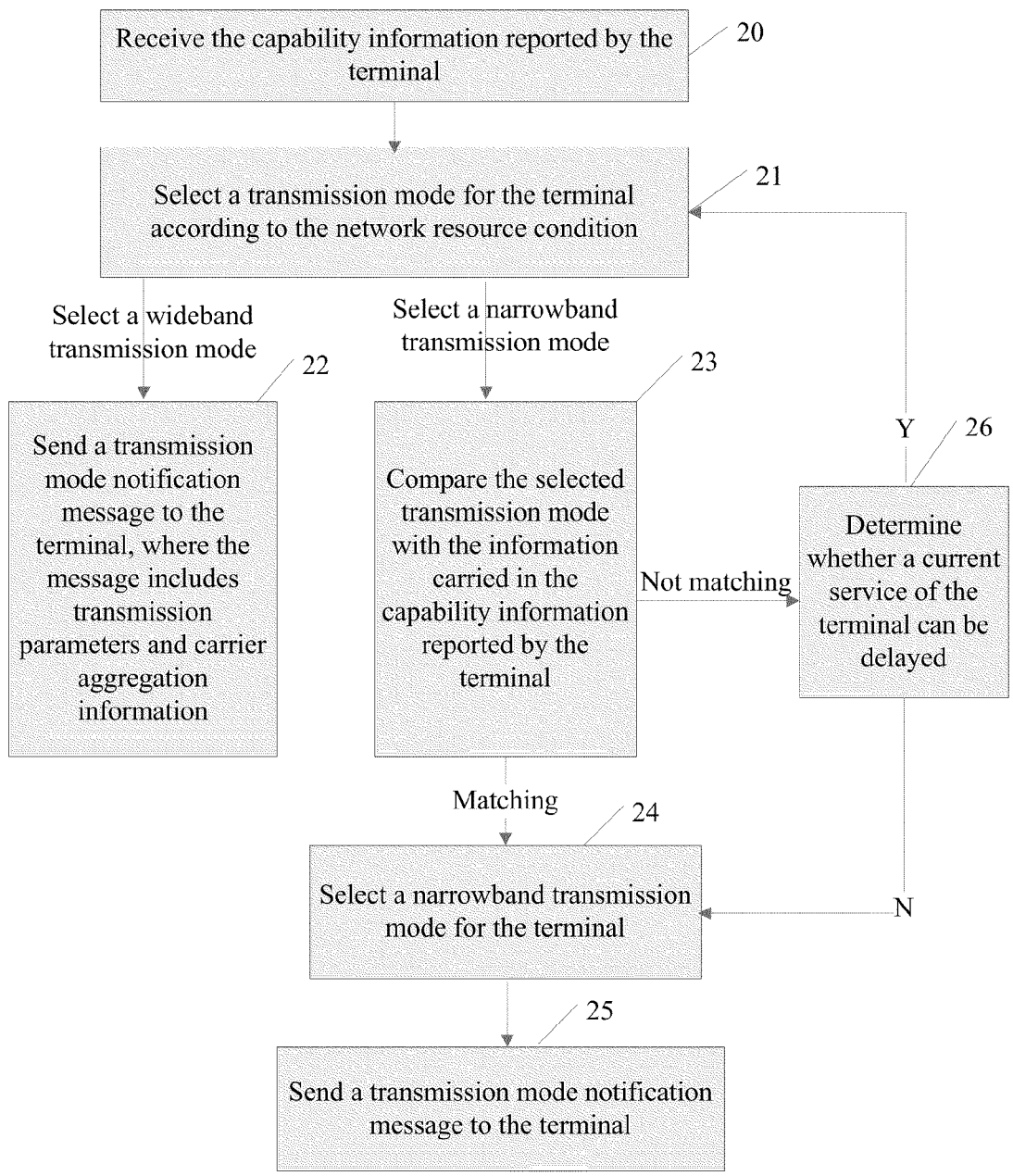
FIG. 2 is a flowchart of a method for determining a transmission mode according to a second embodiment of the present invention.

As shown in FIG. 2, a method for determining a transmission mode as described in a second embodiment of the present invention may include:

Step 20: Receive capability information reported by a terminal, where the information carries information about a transmission mode matching the terminal. Step 20 may also be performed after step 21.

As in the first embodiment, the information about a transmission mode matching the terminal may be carried by 1 bit of information, for example, 0 indicates that a wideband transmission mode is suitable for the terminal, while 1 indicates that a narrowband transmission mode is suitable for the terminal, or vice versa. Here, a transmission mode that is suitable for the terminal may indicate a transmission mode in which the power consumption of the terminal is lower. Alternatively, 0 indicates that the power consumption of the terminal is approximately the same in a wideband transmission mode and in a narrowband transmission mode, while 1 indicates that the power consumption of the terminal in a narrowband transmission mode is higher than that in a wideband transmission mode, or vice versa.

Step 21: Select a transmission mode for the terminal according to a network resource condition; the specific selection method is same as that in the first embodiment.

In order to improve system efficiency, it may be that if the transmission mode selected for the terminal in step 21 is a wideband transmission mode, the selection result is directly notified to the terminal without being compared with the capability information reported by the terminal.

Step 22: If a wideband transmission mode is selected for carrying out data transmission, send a transmission mode notification message to the terminal to notify the terminal of the current transmission mode, namely, the wideband transmission mode. The message includes transmission parameters and carrier aggregation information. The transmission parameters may include transmission power, number of PRBs allocated for the terminal, and so on.

Step 23: If a narrowband transmission mode is selected for the terminal, compare the selected transmission mode with the information carried in the capability information reported by the terminal. If the selected transmission mode matches with the information carried in the capability information reported by the terminal, proceed to step 24; otherwise, proceed to step 26. For example, if the information carried in the capability information is "the power consumption of the terminal is approximately the same in a wideband transmission mode and in a narrowband transmission mode", determine that the matching succeeds, and proceed to step 24; and if the carried information is "the power consumption of the terminal in a narrowband transmission mode is higher than that in a wideband transmission mode", determine that the matching fails, and proceed to step 26.

Step 24: Select a narrowband transmission mode for the terminal.

Step 25: Send a transmission mode notification message to the terminal to notify the terminal of the current transmission mode, namely, the narrowband transmission mode. The message includes transmission parameters. The transmission parameters may include transmission power, number of PRBs allocated for the terminal, and so on.

Step 26: Determine whether a current service of the terminal can be delayed for a predetermined time period, where the time period that can be delayed depends on the maximum delay allowed by the current service of the terminal. If the current service of the terminal can be delayed for a predetermined time period, after a delay for a predetermined time period, proceed to step 21, and if the current service of the terminal cannot be delayed for a predetermined time period, proceed to step 24.

As seen from the technical solution of the second embodiment of the present invention, in the second embodiment of the present invention, a suitable transmission mode is selected for a terminal according to the capability information reported by the terminal. Therefore, by using the technical solution of the embodiment of the present invention, the power consumption of the terminal is reduced.

Those skilled in the art may understand that all or part of processes in the methods of the preceding embodiments may be implemented by relevant hardware instructed by a computer program. The computer program may be stored in a computer readable storage medium and when being executed, may include the processes of the embodiments of the preceding methods. The storage medium may be a magnetic disk, a compact disk-read only memory (CD-ROM), a read only memory (ROM), a random access memory (RAM), and so on.

Figure 3:
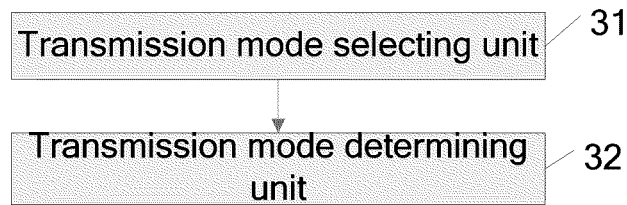
FIG. 3 is a schematic diagram of an apparatus for determining a transmission mode according to a third embodiment of the present invention.

In addition, the third embodiment of the present invention also provides an apparatus for determining a transmission mode. As shown in FIG. 3, the apparatus includes:

a transmission mode selecting unit 31, configured to select a transmission mode for a terminal according to a network resource condition; and a transmission mode determining unit 32, configured to judge whether the selected transmission mode matches according to capability information of the terminal and if the selected transmission mode matches, set the transmission mode as a current transmission mode of the terminal.

Figure 4:
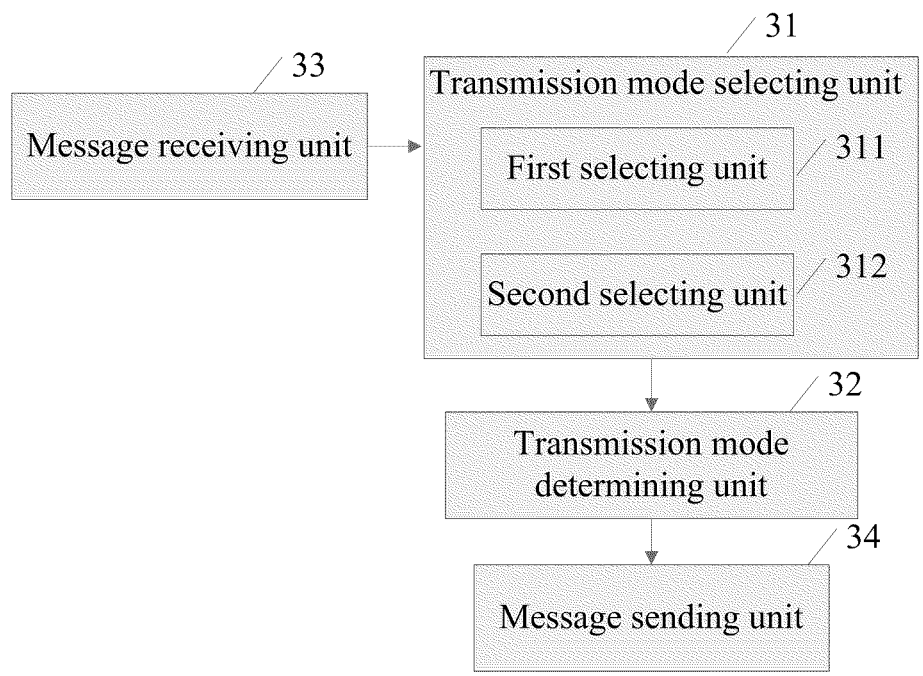
FIG. 4 is a block diagram of an apparatus for determining a transmission mode according to the third embodiment of the present invention.

As shown in FIG. 4, the transmission mode selecting unit 31 includes:

a first selecting unit 311, configured to select a wideband transmission mode for the terminal when in the uplink direction, the buffer of the terminal is capable of meeting a requirement for uplink data transmission and uplink interference is less than a first preset threshold; otherwise, select a narrowband transmission mode; and/or a second selecting unit 312, configured to select a wideband transmission mode for the terminal when in the downlink direction, the PRBs allocated for the terminal meet a requirement for downlink data transmission and downlink interference is less than a second preset threshold; otherwise, select a narrowband transmission mode.

The first preset threshold and the second preset threshold may be set based on a specific need.

In addition, the transmission mode selecting unit 31 is also configured to reselect, when the selected transmission mode does not match, a transmission mode for the terminal according to the network resource condition after a delay for a predetermined time period. The transmission mode determining unit 32 is also configured to set the selected transmission mode as the current transmission mode of the terminal if the selected transmission mode does not match and the current service of the terminal does not allow a delay for a predetermined time period.

As shown in FIG. 4, the embodiments of the present invention may also include: a message receiving unit 33, configured to receive the capability information sent by the terminal and to send the capability information to the transmission mode selecting unit 31; and a message sending unit 34, configured to send a transmission mode notification message to the terminal to notify the terminal of the transmission mode selected for the terminal.

In the third embodiment of the present invention, a suitable transmission mode may be selected for the terminal according to the capability information of the terminal. Therefore, by using the technical solution of the embodiment of the present invention, the power consumption of the terminal is reduced.

Figure 5:
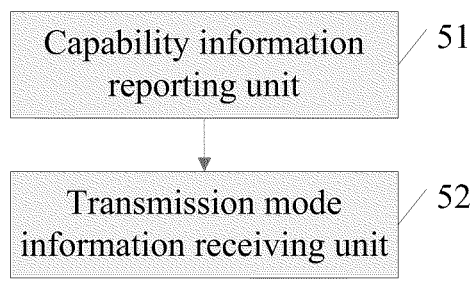
FIG. 5 is a schematic diagram of a terminal according to a fourth embodiment of the present invention.

An embodiment of the present invention also provides a terminal. As shown in FIG. 5, the terminal includes:

a capability information reporting unit 51, configured to report capability information of the terminal, where the capability information of the terminal carries information about a transmission mode suitable for the terminal and the information about the transmission mode suitable for the terminal is used for indicating the transmission mode in which the power consumption of the terminal is lower; and a transmission mode information receiving unit 52, configured to receive transmission mode information that is determined by the network according to the capability of the terminal.

The terminal according to the embodiment of the present invention can report the information about the transmission mode suitable for the terminal to the network, thereby enabling an eNB to select a matching transmission mode for the terminal in order to reduce the power consumption of the terminal.

Detailed above are only exemplary embodiments of the present invention, but the protection scope of the present invention is not limited thereto. Any modification or substitution readily conceivable by those skilled in the art within the scope of technical disclosures of the present invention shall be covered within the protection scope of the present invention. Therefore, the protection scope of the present invention is subject to the appended claims.

What is claimed is:

1. A method for determining a transmission mode, the method comprising:
    selecting either a narrowband transmission mode of a communications protocol or a wideband transmission mode of the communications protocol for a terminal according to a network resource condition;
    determining whether a first terminal power consumption associated with the narrowband transmission mode of the communications protocol exceeds a second terminal power consumption associated with the wideband transmission mode of the communications protocol according to capability information reported by the terminal; and
    setting either the narrowband transmission mode or the wideband transmission mode as a current transmission mode of the communications protocol used by the terminal based on terminal power consumptions associated with the respective transmission modes, wherein the narrowband transmission mode is set as the current transmission mode of the communications protocol if the first terminal power consumption fails to exceed the second terminal power consumption.

2. The method according to claim 1, wherein the method further comprises:
    reselecting a transmission mode for the terminal according to the network resource condition after a predetermined time period if the first terminal power consumption exceeds the second terminal power consumption.

3. The method according to claim 1, wherein the method further comprises:

determining whether a current service requirement of the terminal permits latency periods in excess of a predetermined time period;

setting the selected transmission mode as the current transmission mode of the terminal if the current service requirement prohibits latency periods in excess of the predetermined time period; and reselecting a transmission mode for the terminal according to the network resource condition after the predetermined time period if the first terminal power consumption exceeds the second terminal power consumption and the current service requirement permits latency periods in excess of the predetermined time period.

4. The method according to claim 1, wherein selecting either the narrowband transmission mode or the wideband transmission modes for the terminal according to the network resource condition comprises:

selecting the wideband transmission mode for uplink communications when a buffer of the terminal is capable of meeting a requirement for uplink data transmission and uplink interference is less than a first preset threshold; and selecting the narrowband transmission mode for uplink communications when the buffer of the terminal is not capable of meeting the requirement for uplink data transmission or the uplink interference exceeds the first preset threshold.

5. The method according to claim 1, wherein selecting either the narrowband transmission mode or the wideband transmission modes for the terminal according to the network resource condition comprises:

selecting the wideband transmission mode for downlink communications when physical resource blocks (PRBs) allocated for the terminal meet a requirement for downlink data transmission and downlink interference is less than a second preset threshold; and selecting the narrowband transmission mode for downlink communications when the PRBs allocated for the terminal do meet the requirement for downlink data transmission or the downlink interference exceeds the second preset threshold.

6. The method according to claim 1, wherein the method further comprises receiving the capability information reported by the terminal before selecting the transmission mode for the terminal.

7. The method according to claim 6, wherein the method further comprises sending a transmission mode notification message to the terminal to notify the terminal of the current transmission mode.

8. An apparatus for determining a transmission mode, the apparatus comprising:

a transmission mode selecting unit configured to select either a narrowband transmission mode of a communications protocol or a wideband transmission mode of the communications protocol for a terminal according to a network resource condition; and a transmission mode determining unit configured to determine whether a first terminal power consumption associated with the narrowband transmission mode exceeds a second terminal power consumption associated with the wideband transmission mode according to capability information of the terminal, and to set either the narrowband transmission mode or the wideband transmission mode as a current transmission mode of the communications protocol used by the terminal based on terminal power consumptions associated with the respective transmission modes, wherein the narrowband transmission mode is set as the current transmission mode of the communications protocol if the first terminal power consumption fails to exceed the second terminal power consumption.

9. The apparatus according to claim 8, wherein the transmission mode selecting unit is further configured to reselect a transmission mode for the terminal according to the network resource condition after a predetermined time period if the first terminal power consumption exceeds the second terminal power consumption.

10. The apparatus according to claim 8, wherein the transmission mode determining unit is further configured to set the narrowband transmission mode as the current transmission mode of the terminal if the first terminal power consumption exceeds the second terminal power consumption and a current service requirement of the terminal does not allow latency periods in excess of a predetermined time period.

11. The apparatus according to claim 8, wherein the transmission mode selecting unit comprises a first selecting unit configured to select the wideband transmission mode for uplink communications when a buffer of the terminal is capable of meeting a requirement for uplink data transmission and uplink interference is less than a first preset threshold, and otherwise to select the narrowband transmission mode.

12. The apparatus according to claim 8, wherein the transmission mode selecting unit comprises a second selecting unit configured to select the wideband transmission mode for downlink communications when physical resource blocks (PRBs) allocated for the terminal meet a requirement for downlink data transmission and downlink interference is less than a second preset threshold, and otherwise to select the narrowband transmission mode.

13. The apparatus according to claim 8, wherein the transmission mode selecting unit comprises:

a first selecting unit configured to select the wideband transmission mode for uplink communications when a buffer of the terminal is capable of meeting a requirement for uplink data transmission and uplink interference is less than a first preset threshold, and otherwise to select the narrowband transmission mode; and a second selecting unit configured to select the wideband transmission mode for downlink communications when physical resource blocks (PRBs) allocated for the terminal meet a requirement for downlink data transmission and downlink interference is less than a second preset threshold, and otherwise to select the narrowband transmission mode.

14. The apparatus according to claim 8, wherein the apparatus further comprises a message receiving unit configured to receive the capability information reported by the terminal and to send the capability information to the transmission mode selecting unit.

15. The apparatus according to claim 8, wherein the apparatus further comprises a message sending unit configured to send a transmission mode notification message to the terminal to notify the terminal of the current transmission mode.

16. An apparatus comprising:

a processor; and a computer readable storage medium storing programming for execution by the processor, the programming including instructions to:

select either a narrowband transmission mode of a communications protocol or a wideband transmission mode of a communications protocol for a terminal according to a network resource condition;

determine whether a first terminal power consumption associated with the narrowband transmission mode exceeds a second terminal power consumption associated with the wideband transmission mode according to capability information reported by the terminal; and set either the narrowband transmission mode or the wideband transmission mode as a current transmission mode of the communications protocol used by the terminal based on terminal power consumptions associated with the respective transmission modes, wherein the narrowband transmission mode is set as the current transmission mode of the communications protocol if the first terminal power consumption fails to exceed the second terminal power consumption.

17. The apparatus of claim 16, wherein the programming further includes instructions to:

reselect a transmission mode for the terminal according to the network resource condition after a predetermined time period if the first terminal power consumption exceeds the second terminal power consumption.

18. The apparatus of claim 16, wherein the programming further includes instructions to:

determine whether a current service requirement of the terminal permits latency periods in excess of a predetermined time period;

set the narrowband transmission mode as the current transmission mode of the terminal if the current service requirement of the terminal prohibits latency periods in excess of the predetermined time period; and reselect a transmission mode for the terminal according to the network resource condition after the predetermined time period if the first terminal power consumption exceeds the second terminal power consumption and the current service requirement of the terminal permits latency periods in excess of the predetermined time period.

19. A method for determining a transmission mode, the method comprising:

selecting either a narrowband transmission mode of a communications protocol or a wideband transmission mode of the communications protocol for communications between a terminal and a base station according to a network resource condition;

determining whether a first power consumption of the terminal when communicating in accordance with the narrowband transmission mode exceeds a second power consumption of the terminal when communicating in accordance with the wideband transmission mode according to capability information reported by the terminal; and setting either the narrowband transmission mode or the wideband transmission mode as a current transmission mode of the communications protocol used for communications between the terminal and the base station based on terminal power consumptions associated with the respective transmission modes, wherein the narrowband transmission mode is set as the current transmission mode of the communications protocol if the first power consumption fails to exceed the second power consumption.

20. The method of claim 19, further comprising:

determining whether a current service requirement of the terminal permits latency periods in excess of a predetermined time period;

setting the narrowband transmission mode as the current transmission mode of the terminal if the current service requirement of the terminal prohibits latency periods in excess of the predetermined time period; and reselecting a transmission mode for the terminal according to the network resource condition after the predetermined time period if both the first power consumption fails to exceed the second power consumption and the current service requirement of the terminal permits latency periods in excess of the predetermined time period.

* * * * *